United States Patent Office 3,268,487
Patented August 23, 1966

3,268,487
PROCESS FOR POLYMERIZATION OF LACTIDES
Arie Klootwijk, Amsterdam, Netherlands, assignor to Shell Oil Company, New York, N.Y., a corporation of Delaware
No Drawing. Filed Aug. 10, 1964, Ser. No. 388,662
Claims priority, application Netherlands, Dec. 23, 1963, 302,456
8 Claims. (Cl. 260—78.3)

This invention relates to a process for preparing high molecular weight linear polyesters from lactides. More particularly, the invention relates to a process of polymerizing lactides in high yield at relatively low temperatures using at least one catalyst selected from amines and quaternary ammonium compounds.

Specifically, the present invention provides an improved process for preparing high molecular weight linear polyesters which have the recurring unit

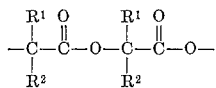

in their molecular structure where $R^1$ and $R^2$ are selected from hydrogen, and organic radicals, comprising polymerizing a lactide in the presence of at least one catalyst selected from amines and quaternary ammonium compounds, and preferably a tertiary amine.

It is known that linear polyesters having the recurring unit

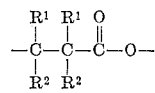

may be prepared by polymerizing a lactone, such as a beta-lactone, in the presence of a catalyst. It was found that the most effective catalysts for use in the ring-opening polymerization of lactones were the phosphines, arsines and stibines. However, when these catalysts are employed in the ring-opening polymerization of lactides, the yields are relatively low and the reaction temperatures high resulting in a discolored product.

Accordingly, it is an object of this invention to provide a process for preparing high molecular weight linear polyesters in high yield and at relatively low temperatures. It is a further object to provide a clear polyester product. These and other objects and advantages will be apparent from the following detailed description of the invention.

It has now been found that these and other objects may be accomplished by providing a process for polymerizing lactides wherein the polymerization reaction is carried out in the presence of at least one catalyst selected from amines and quaternary ammonium compounds, and preferably a tertiary amine.

The polyesters prepared according to the process of the present invention have the recurring unit

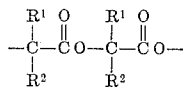

wherein $R^1$ and $R^2$ are hydrogen atoms or an organic radical, such as an alkyl, cycloalkyl, haloalkyl, hydroxyalkyl, alkoxy, phenol, alkaryl, hydroxyphenyl and haloaryl radicals. Preferable $R^1$ and $R^2$ are hydrogen atoms or an alkyl group having from 1 to 4 carbon atoms, such as methyl, ethyl, etc. The term "polymerization" as used in this specification includes copolymerization of lactides or of a lactide with other polymerizable compounds, such as epoxides, lactones and ethylenically unsaturated compounds.

The lactides which may be polymerized according to this invention include those of the formula

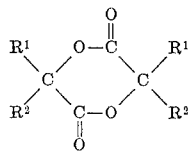

wherein $R^1$ and $R^2$ are as previously defined. The preferred lactides are those of the general formula

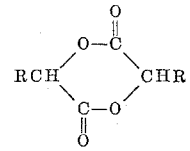

wherein R is hydrogen or an alkyl radical having from 1 to 4 carbon atoms. Especially preferred are glycolide and lactide.

The polymerization catalysts to be used in the process of this invention are amines, quaternary ammonium compounds and addition compounds of amines.

The amines may be primary, secondary or tertiary amines, and may be represented by the formula

wherein $R^3$ is selected from hydrogen atoms, alkyl, haloalkyl, hydroxyalkyl and phenyl radicals, with the proviso that at least one $R^3$ is one of the above-mentioned radicals. The tertiary amines are generally more active, and particularly those in which the three $R^3$'s are alkyl groups.

Examples of the above amines include trimethylamine, triethylamine, tri(betachloroethyl)amine, tri(betahydroxyethyl)amine, tripropylamine, triisopropylamine, methyldiethylamine, tri-n-butylamine, diethyl-n-butylamine, dimethylhexylamine, triphenylamine, as well as diethylamine, di-n-propylamine, diisopropylamine, dibutylamine, monobutylamine and monophenylamine.

Examples of quaternary ammonium compounds which are suitable catalysts in the process of the present invention include compounds of the formula

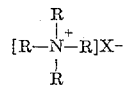

wherein R is as previously define and X is an anion. The preferred quaternary compounds are those in which R is an alkyl group having from 1 to 4 carbon atoms and X is a halogen atom or hydroxy group, such as tetraalkylammonium chloride, bromide or hydroxide, for example tetraethylammonium bromide and tetraethylammonium hydroxide. These compounds may be considered as addition compounds formed from amines by addition thereto of compounds in which hydrogen atoms or hydrocarbon radicals are linked to hydroxyl groups or acid radicals.

The total number of carbon atoms in the hydrocarbon radicals linked to the nitrogen atom of the catalyst is preferable from 3 to 25.

Although the polymerization reaction according to the process of the present invention is possible in the absence of a diluent, the use of a diluent is recommended since it greatly facilitates working up the polymer. Suitable diluents include aliphatic hydrocarbons, such as 2,2,4-trimethylpentane and cyclohexane; aromatic-hydrocarbons such as benzene and toluene; halogenated hydrocarbons, such as chloroform; nitrated hydrocarbons, such as dinitrobenzene; ethers, such as dioxan, tetrahydrofuran and the dimethyl ether of glycol; esters such as ethyl acetate, isopropyl acetate and butyl acetate; and nitriles, such as acetonitrile. Suitable concentrations of the monomer(s) in the diluent generally are between 2% and 50% by weight, based on the total mixture. The presence of water is to be avoided as much as possible.

The concentration of the catalyst in the reaction mixture may be widely varied. Usually, the concentration of the catalyst is from 0.001% and 10% by weight, and generally from 0.1% to 1% by weight, based on the total monomer(s).

The temperature at which the polymerization reaction takes place is generally between 0° and 150° C. Temperatures outside of this range, however, may offer advantages in special cases.

Monomers that may be polymerized with the lactides include, for example; lactones, such as alpha-alpha-dimethyl-beta-propiolactone; epoxy compounds, such as ethylene oxide, propylene oxide, epichlorohydrin and glycidyl ethers and esters; and lactams, such as caprolactam.

Copolymerization of the lactides or other polymerizable monomers may be conducted in various ways, so that the type of product may be varied. For example, if the ratio between the concentrations of the various monomers remains constant during polymerization, the copolymer produced will consist of the various monomers in the same ratio; also if there is initially only one monomer present in the reaction mixture and another is not added until the first has homopolymerized for a period, copolymer chains, called block polymers, will be produced in which segments consisting entirely of the first monomer will be attached to segments consisting of the second monomer.

The polymerization according to this invention may be carried out either batchwise or continuously. In a continuous process employing, for example, a tubular reactor wherein the reacting mixture flows through one or more reactors in which the reaction mixture is stirred, there are means provided for introducing monomer, catalyst and, if desired, diluent and means provided for withdrawing the mixture formed.

The polymers obtained according to this invention exhibit very attractive properties. They withstand relatively high temperatures, and in many cases have a very high softening point, while possessing satisfactory mechanical properties. These polymers are suitable for numerous applications, such as the manufacture of threads, fibers and films and the molding of objects.

To illustrate the manner in which the invention may be carried out, the following examples are given. It is understood, however, that the examples are for the purposes of illustration and the invention is not to be regarded as limited to any of the specific materials or conditions therein.

EXAMPLE I

*Polymerization of glycolide (the lactide of glycolic acid)*

200 grams of glycolide are mixed with 900 grams of dioxan and 1.75 grams of triethylamine. The homogeneous reaction mixture is maintained for 24 hours at 80° C. The polyester is separated in the crystalline phase, filtered, washed with ethanol and dried in vacuum at 50° C. The yield is 70% and the crystalline polyester has a melting point of 216°–219° C.

COMPARISON

The procedure of Example I is repeated using 1.75 grams of triethylphosphine in place of triethylamine. The yield of polyester in this instance is only 35%.

EXAMPLE II

*Polymerization of lactide (the lactide of lactic acid)*

228 grams of lactide are mixed with 900 grams of dioxan and 2 grams of tri(betachloroethyl)amine. The homogeneous reaction mixture is maintained at 80° C. for 24 hours. The polyester having a melting point of 128° C. is separated in the crystalline phase, filtered, washed with ethanol and dried in vacuum at 50° C. The yield is 162 grams.

EXAMPLE III TO V

The procedure of Example I is repeated in Examples III to V using as the catalyst 1.75 grams of methyldiethylamine, triphenylamine and dibutylamine, respectively, in place of the triethylamine of Example I. Results similar to those of Example I are obtained.

EXAMPLE VI TO VIII

The procedure of Example II is repeated in Examples VI to VIII using as the catalyst 2 grams of monobutylamine, 2 grams of monophenylamine and 2 grams of tetraethylammonium hydroxide, respectively, in place of tri(betachloroethyl)amine. Results similar to those of Example II are obtained.

EXAMPLE IX

*Copolymerization of glycolide and epichlorohydrin*

The procedure of Example I is repeated with the exception that in place of the 200 grams of glycolide 116 grams of glycolide and 82 grams of epichlorohydrin are mixed with 900 grams of dioxan. The resulting polyester consisted of the above monomers in equal proportions.

I claim as my invention:

1. A process for preparing polyesters consisting of the repeating unit

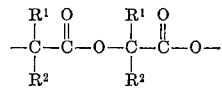

wherein $R^1$ and $R^2$ are selected from the group consisting of hydrogen atoms, alkyl, cycloalkyl, haloalkyl, alkoxy, phenol, alkaryl, hydroxyphenyl and haloaryl radicals, consisting of polymerizing one or more lactides in the presence of from 0.1% to 10% of at least one catalyst selected from the group consisting of amines and quaternary ammonium compounds.

2. A process for preparing polyesters consisting of the recurring unit

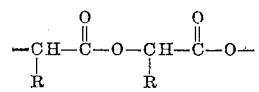

which consists of polymerizing one or more lactides of the formula

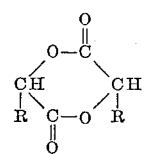

in the presence of from 0.1% to 10% of a catalyst selected from the group consisting of amines and quaternary ammonium compounds at a temperature of from 0° to 150° C., wherein R is selected from the group consisting of hydrogen and alkyl groups having from 1 to 4 carbon atoms.

3. A process according to claim 2 wherein the polymerization reaction is carried out in the presence of an inert diluent.

4. A process according to claim 3 wherein the inert diluent is dioxan.

5. A process according to claim 2 wherein the catalyst is an amine having the formula

wherein $R^3$ is selected from the group consisting of hydrogen atoms, alkyl, haloalkyl, hydroxyalkyl and phenyl radicals with the proviso that at least one of the $R^3$'s is a radical.

6. A process according to claim 5 wherein the catalyst is triethylamine.

7. A process according to claim 5 wherein the catalyst is triphenyl amine.

8. A process for preparing a polyester consisting of the recurring unit

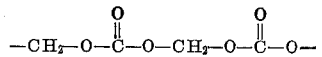

which comprises heating at a temperature of about 80° C. a mixture comprising glycolide, from about 2 to 50% by weight of dioxan based upon the weight of the total mixture and about 1% by weight of triethylamine based upon the weight of glycolide present in the total mixture.

References Cited by the Examiner

Die Makromolekulare Chemie, Kleine et al., 30 (1959), 23 to 38.

JOSEPH L. SCHOFER, *Primary Examiner.*

JAMES A. SEIDLECK, *Examiner.*

L. WOLF, *Assistant Examiner.*